Nov. 27, 1928.

F. KÖCHY 1,693,582

DOUGH KNEADING MACHINE

Filed April 5, 1928

Inventor:
Friedrich Köchy

Patented Nov. 27, 1928.

1,693,582

UNITED STATES PATENT OFFICE.

FRIEDRICH KÖCHY, OF KLOSTER-GRONINGEN, NEAR HALBERSTADT, GERMANY.

DOUGH-KNEADING MACHINE.

Application filed April 5, 1928, Serial No. 267,698, and in Germany February 21, 1928.

This invention relates to dough-kneading machines of the kind wherein the trough revolves about a movable kneading arm.

The cleaning of the trough in machines of this kind is ordinarily effected by hand while the machine is in movement and involves work of a strenuous kind, care having meanwhile to be taken to prevent the scraper from coming into conflict with the moving kneading arm.

The object of the present invention is to provide mechanical means for scraping the trough, and the invention consists in the provision of a scraper which is shaped in conformity with the trough wall and carried on the machine frame by a double-armed lever one arm of which bears against a screw spindle whereby the scraper can be applied to the trough with greater or less force not only for scraping but also for braking purposes.

Figure 1:
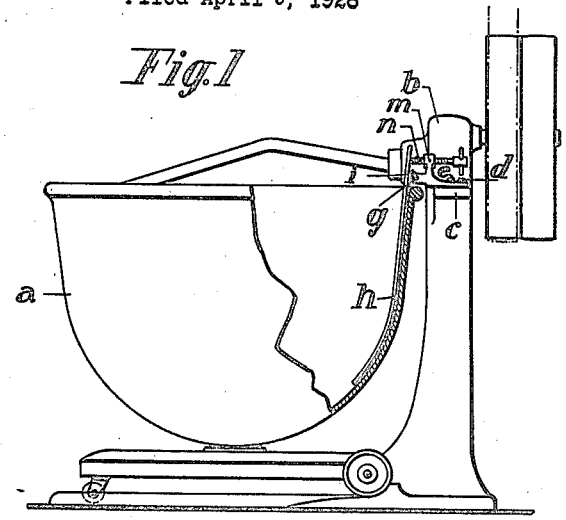
Figure 2:
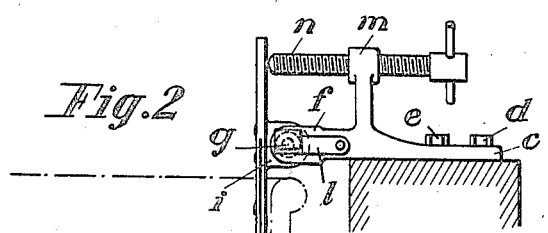
Figure 3:
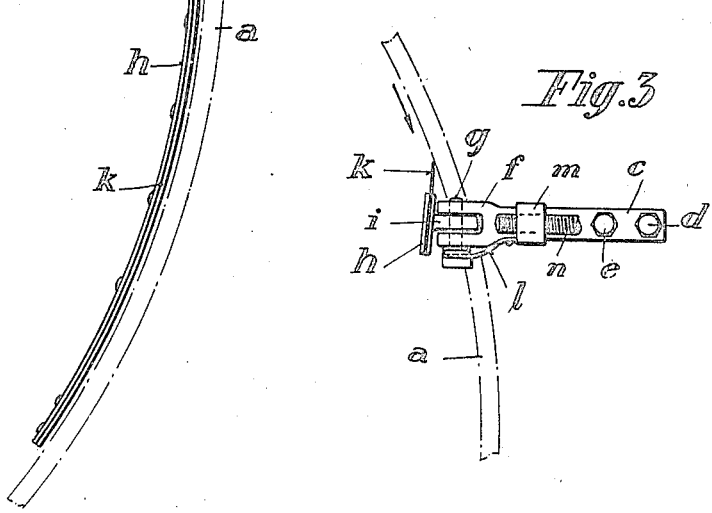

Fig. 1 of the accompanying drawing represents a side view of the machine, partly in section, Fig. 2, a part section of the same on an enlarged scale, and Fig. 3, a top view of the scraper and its support.

The kneading machine comprises a trough $a$ which revolves in known manner about a kneading arm which is itself kept in motion. According to the invention a scraper is provided which is carried by a double-armed lever $h$ and which is bent in conformity with the wall of the trough, as best shown in Fig. 2. The scraper has a lug $i$ whereby it is mounted on a detachable pivot pin $g$ held in a fork $f$. The latter is either integral with or connected to a supporting bar $c$ whereby it is secured through the medium of screws $d$ and $e$ to the machine frame $b$. A bracket $m$ on the bar $c$ carries a screw-spindle $n$ which bears against the upper, short arm of the lever $h$ and serves as a means for applying the latter with greater or less force against the trough.

The supporting bar $c$ also has a pivoted latch $l$ which is adapted to be turned in front of the head of the pivot pin $g$ for retaining the latter normally in position. There is a Z-shaped plate at the free end of the latch. One end member of this plate is adapted to bear against the head of the pin so as to support the latch in locking position while the other end member is adapted to serve as an operating handle. This arrangement allows the latch to be easily turned aside so as to clear the pin when the latter is to be detached for the removal of the scraper.

The scraper is preferably composed, as shown in Fig. 3, of two flat bars which are clamped together over one or more strips $k$ constituting the scraping edge, one of the bars forming part of the lever $h$. The strip or strips $k$ are made of wood, celluloid or other material which does not injure the trough surface. The scraper is, as shown in Fig. 3, held at an angle to the trough surface and set against the travelling direction of the trough. Those edges of the bars from between which the scraper strips project are preferably bevelled so as to prevent contact with the trough at one side of the scraper strip and prevent clogging up of the scraper at the other side.

The screw-holes in the bar $c$ for the screws $d$ and $e$ are preferably elongated so as to allow the position of the scraper relative to the trough wall to be adjusted. The fork $f$ may be so connected to the bar $c$ as to allow its angular position to the bar, and thus the angular position of the scraper to the trough, to be varied.

The scraper, applied by means of the screw spindle $n$, can be conveniently used as a brake for the machine, it being thus possible to dispense with the usual braking mechanism.

I claim:

1. In a dough-kneading machine, the combination with a machine frame and with a revolving trough, of a brake in the form of a scraper arranged in the trough and shaped in conformity with the wall thereof, a double-armed lever pivoted to the machine frame and carrying said scraper, and a screw spindle supported by the machine frame and bearing against one arm of said lever for applying the scraper to the trough with greater or less force according to its adjustment.

2. A structure as claimed in claim 1 wherein the pivotal support for the lever comprises a bar secured to the machine frame, a lug on the lever, a fork on the bar adapted to receive said lug, a detachable pivot pin passing through the fork and through the lever, and a latch pivoted to the bar so as to allow of being used for locking the pivot pin in position.

3. A structure as claimed in claim 1 wherein the pivotal support for the lever comprises a bar secured adjustably to the machine frame, a lug on the lever, a fork adapted to receive said lug secured adjustably to said arm, a detachable pivot pin passing through the fork and through the lug, and a latch pivoted to the bar so as to allow of being used for locking the pivot pin in position.

4. A structure as claimed in claim 1 wherein the scraper is composed of two flat metal bars which are clamped together over a projecting strip of material which is softer than that of the trough.

FRIEDRICH KÖCHY.